US009699078B1

(12) United States Patent
Chen et al.

(10) Patent No.: US 9,699,078 B1
(45) Date of Patent: Jul. 4, 2017

(54) MULTI-PLANED UNIFIED SWITCHING TOPOLOGIES

(71) Applicant: International Business Machines Corporation, Armonk, NY (US)

(72) Inventors: Dong Chen, Scarsdale, NY (US); Philip Heidelberger, Cortlandt Manor, NY (US); Yutaka Sugawara, Eastchester, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/982,547

(22) Filed: Dec. 29, 2015

(51) Int. Cl.
*H04L 12/771* (2013.01)
*H04L 12/775* (2013.01)
*H04L 12/46* (2006.01)
*H04L 12/715* (2013.01)

(52) U.S. Cl.
CPC ............ *H04L 45/583* (2013.01); *H04L 12/46* (2013.01); *H04L 45/04* (2013.01)

(58) Field of Classification Search
None
See application file for complete search history.

(56) References Cited

U.S. PATENT DOCUMENTS

| | | | | |
|---|---|---|---|---|
| 6,192,422 | B1 * | 2/2001 | Daines | H04L 12/46 709/232 |
| 7,440,448 | B1 * | 10/2008 | Lu | H04L 1/22 370/380 |
| 8,750,288 | B2 | 6/2014 | Nakil et al. | |

(Continued)

FOREIGN PATENT DOCUMENTS

| | | |
|---|---|---|
| CN | 101141404 | 3/2011 |
| CN | 103795570 | 5/2014 |
| CN | 104539438 | 4/2015 |

OTHER PUBLICATIONS

Disclosed anonymously, "Method and Apparatus for Generating code to connect a controller to members of a distributed switch", (Jan. 2013), IPCOM000225125D.

(Continued)

*Primary Examiner* — Chirag Shah
*Assistant Examiner* — Rina Pancholi
(74) *Attorney, Agent, or Firm* — Scully, Scott, Murphy & Presser, PC; Daniel P. Morris, Esq.

(57) ABSTRACT

An apparatus and method for extending the scalability and improving the partitionability of networks that contain all-to-all links for transporting packet traffic from a source endpoint to a destination endpoint with low per-endpoint (per-server) cost and a small number of hops. An all-to-all wiring in the baseline topology is decomposed into smaller all-to-all components in which each smaller all-to-all connection is replaced with star topology by using global switches. Stacking multiple copies of the star topology baseline network creates a multi-planed switching topology for transporting packet traffic. Point-to-point unified stacking method using global switch wiring methods connects multiple planes of a baseline topology by using the global switches to create a large network size with a low number of hops, i.e., low network latency. Grouped unified stacking method increases the scalability (network size) of a stacked topology.

21 Claims, 11 Drawing Sheets

(56) References Cited

U.S. PATENT DOCUMENTS

| | | | |
|---|---|---|---|
| 2002/0075540 A1* | 6/2002 | Munter | H04Q 11/0062 |
| | | | 398/82 |
| 2002/0167954 A1* | 11/2002 | Highsmith | H04L 12/2856 |
| | | | 370/406 |
| 2003/0217141 A1* | 11/2003 | Suzuki | H04L 45/02 |
| | | | 709/224 |
| 2007/0014234 A1* | 1/2007 | Santoso | H04L 43/0817 |
| | | | 370/216 |
| 2013/0083701 A1* | 4/2013 | Tomic | H04L 12/462 |
| | | | 370/255 |
| 2013/0111070 A1* | 5/2013 | Mudigonda | H04L 41/145 |
| | | | 709/250 |
| 2015/0120779 A1 | 4/2015 | Lin et al. | |

OTHER PUBLICATIONS

Mysore, et al. PortLand: A Scalable Fault—Tolerant Layer 2 Data Center Network Fabric, ACM SIGCOMM Computer Communication Review, (Aug. 2009), (vol. 39, No. 4, pp. 39-50), ACM.

Press Release: "Fujitsu Laboratories Develops Technology to Reduce Network Switches in Cluster Supercomputers by 40%, Maintains network performance, lowers energy consumption", Fujitsu Laboratories Ltd., Kawasaki, Japan, Jul. 15, 2014, https://www.fujitsu.com/global/about/resources/news/press-releases/2014/0715-02.html.

\* cited by examiner

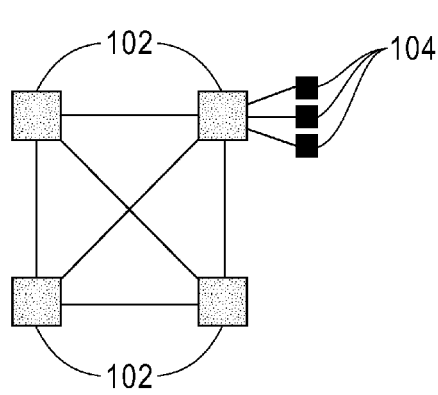
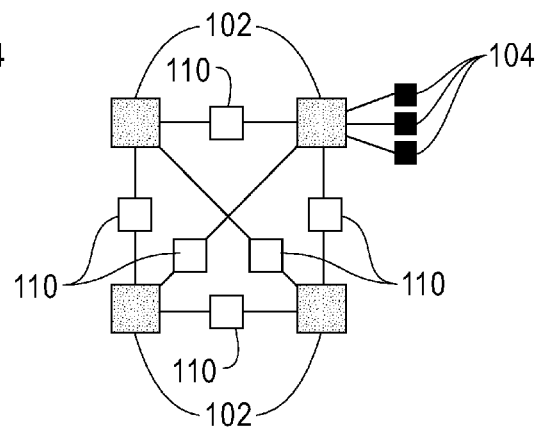
FIG. 1A          FIG. 1B
FIG. 1C

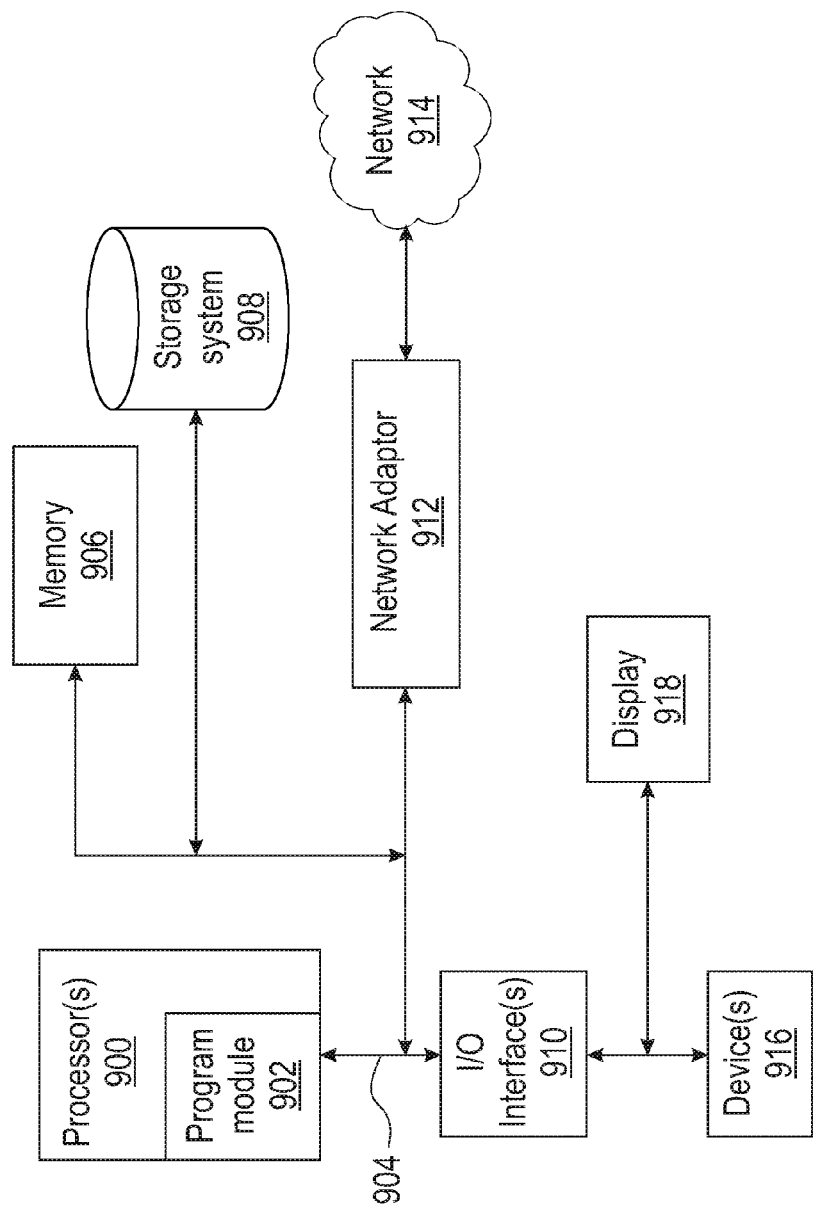

MULTI-PLANED UNIFIED SWITCHING TOPOLOGIES

STATEMENT OF GOVERNMENT RIGHTS

This invention was made with Government support under contract no. DE-AC02-05CH11231 awarded by the U.S. Department of Energy. The Government has certain rights in this invention.

BACKGROUND

Aspects of the present invention generally relate to an apparatus and method for extending the scalability and improving the partitionability of baseline networks for transporting packet traffic from a source endpoint to a destination endpoint. Specifically, aspects of the invention generally relate to apparatus and method to build a large-scale partitionable network by stacking multiple copies of a baseline network. More specifically, aspects of the invention relate to global switches in multiple planes of all-to-all-based networks being stacked and connected via global switches with minimal cost overhead and number of hops.

SUMMARY

Aspects of the invention are an apparatus and method for increasing scalability of a network for transporting packet traffic from a source endpoint to a destination endpoint with low per-endpoint (per-server) cost and a small number of hops. Embodiments of the invention primarily concern an all-to-all wiring in the baseline topology decomposed into smaller all-to-all components in which each small all-to-all connection is replaced with star topology via a global switch.

An exemplary method for building a multiple plane unified stacking topology network comprises providing a baseline network comprising endpoints, edge switches, and links, and containing more than one disjoint all-to-all connections that are not contained in a larger all-to-all connection; duplicating the baseline network to form a multiple plane switching topology; providing global switches connecting multiple planes; replacing the links in all or a subset of the all-to-all connections in each plane with a set of star connections, where each of the target all-to-all connections is decomposed into smaller all-to-all connections and replacing each of the smaller all-to-all connections with a star connection of the same size in each plane and where a global switch acts as the center switch of the star connection and each global switch acts as the center switches of star connections in multiple planes; and connecting each global switch directly to edge switches in multiple planes.

An exemplary multiple plane unified stacking topology network comprises baseline network comprising endpoints, edge switches, and links, and containing more than one disjoint all-to-all connections that are not contained in a larger all-to-all connection; multiple baseline networks forming a multiple plane switching topology; global switches connecting multiple planes; the links in all or a subset of the all-to-all connections in each plane are replaced with a set of star connections, where each of the target all-to-all connections is decomposed into smaller all-to-all connections and replacing each of the smaller all-to-all connections with a star connection of the same size in each plane, and where a global switch acts as the center switch of the star connection and each global switch acts as the center switches of star connections in multiple planes; and each global switch being directly connected to edge switches in multiple planes.

An exemplary multiple plane grouped unified stacked all-to-all topology network comprises a flat all-to-all baseline network comprising endpoints, edge switches, and links; multiple baseline networks forming a multiple plane switching topology; global switches connecting multiple planes; the links in the all-to-all connection in each plane are replaced with a set of star connections, where the all-to-all connection is decomposed into smaller all-to-all connections with size 3 or larger and replacing each of the smaller all-to-all connections with a star connection of the same size in each plane, and where a global switch acts as the center switch of the star connection and each global switch acts as the center switches of star connections in multiple planes; and each global switch being directly connected to edge switches in multiple planes.

The objects, features, and advantage of the present disclosure will become more clearly apparent when the following description is taken in conjunction with the accompanying drawings.

BRIEF DESCRIPTION OF THE DRAWINGS

FIG. 1a shows an embodiment of an all-to-all network topology.

FIG. 1b shows an embodiment of an all-to-all network topology including global switches.

FIG. 1c shows an embodiment of a stack of copies of an all-to-all network topology including global switches created by point-to-point unified stacking.

FIG. 9 is a schematic block diagram of a computer system for practicing various embodiments of the invention.

DETAILED DESCRIPTION OF PREFERRED EMBODIMENTS

Figure 2:
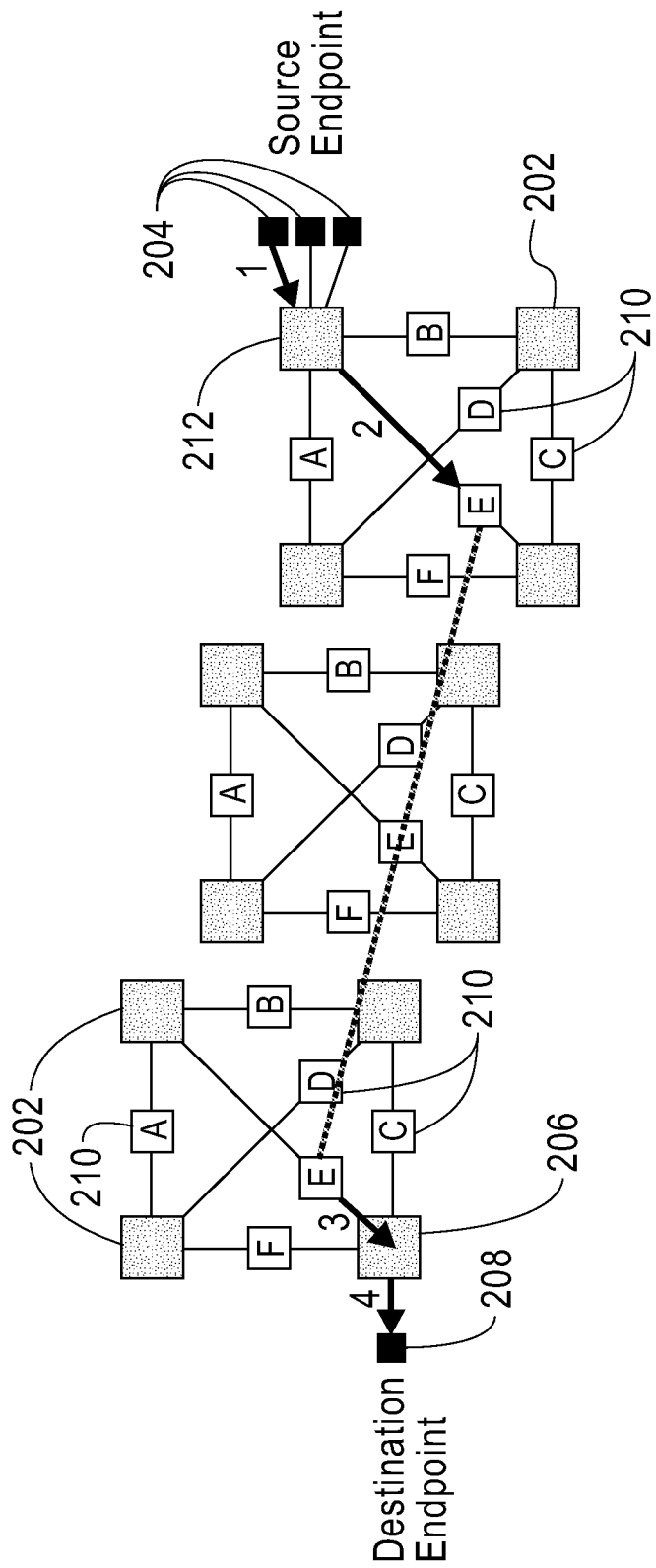
FIG. 2 shows an aspect of a network topology illustrating a direct routing method.

Embodiments of the invention include a method to build an apparatus which is a large-scale partitionable network by stacking multiple copies of a baseline network for transporting packet traffic from a source endpoint to a destination endpoint.

Aspects of the invention cover two variations of methods to build a large scale, low diameter, and partitionable network from a baseline network, as well as network topologies that can be built using the methods. The first variation method, point-to-point unified stacking (2-way stacking), can be applied to various baseline network topology flexibly and can create multiple partitions. The second variation method, grouped unified stacking (3 or more-way stacking), has restrictions on the baseline network topology and can create a lesser number of partitions, but can build larger scale (more endpoints) network than the point-to-point method. Both of the methods can be applied to a baseline network that contains one or more all-to-all connections, such as flat all-to-all, HyperX, or Dragonfly.

Embodiments of the invention cover the following cases: Point-to-point unified stacking method, applied to a base line topology other than a flat all-to-all and grouped unified stacking method, applied to any baseline topology.

Existing all-to-all, Dragonfly, and HyperX network topologies have low diameter and good all-to-all communication bandwidth. They exploit all-to-all interconnection or wiring to achieve these benefits with low cost.

However, all-to-all connections in these topologies have undesirable characteristics. First, the components wired in all-to-all cannot be partitioned efficiently. In a high-performance computing (HPC) system, a large scale system is often divided into multiple partitions used for different jobs. When an all-to-all network is divided into two equally-sized partitions for different independent jobs, half of the original all-to-all links becomes inter-partition idle links. As a result, half of the network bandwidth will be lost. It is still possible to use these inter-partition links for intra-partition communication by means of indirect routing, but that will cause undesirable inter-job interference. Second, it is hard to add new nodes/switches to all-to-all topology. To add a new component, it has to be wired to every existing component to maintain the all-to-all wiring.

To overcome these limitations, aspects of the invention extend an all-to-all based network topology by creating multiple copies of the topology and stacking the copies using global switches. Embodiments of the invention is also useful for increasing the scale of the baseline topology to support more endpoints with small cost overhead (i.e. number of switch ports and links).

The point-to-point unified stacking method can build a large scale network by duplicating a baseline network topology and stacking them via global switches, exploiting all-to-all connections in the baseline network. The increase in hardware (number of switches and links) and diameter (link hops) by this modification is minimal, resulting good cost and latency. In addition, the resulting multiple plane network has features that the baseline network (flat all-to-all, HyperX, Dragonfly) do not typically have: (1) each copy of the baseline network, or plane, can act as an independent partition when the whole network needs to be divided for multiple user tasks, and (2) if there are spare ports on the global switches, new planes could be installed afterward to extend the system scale, without making any changes on the existing links.

The grouped unified stacking method is similar to the point-to-point method but replaces all-to-all connections with more sophisticated star topologies, increasing the scale (number of end points) of each plane.

The scalability of the network increases by up to twice, practically 33 percent to 50 percent, without increasing per-endpoint (per-server) cost and number of hops.

An all-to-all connection in the baseline topology is decomposed into smaller all-to-all connections where each smaller all-to-all connection is replaced with star topology via a global switch. The grouped method also has a benefit of system partitionability and extendibility, similar to the point-to-point method. However, there are restrictions on the baseline network due to the decomposition and replacement steps of all-to-all connections. In addition, group method will create a fewer number of planes, yielding less flexibility in partitioning.

Resulting topologies created using these methods include, but are not limited to, stacked all-to-all, stacked 2D HyperX, and double stacked 2D HyperX. The following description will mainly focus on stacked all-to-all and 2D HyperX topologies, although not limited thereto, since they are simple yet important examples.

DEFINITIONS

An all-to-all connection of size K (K: natural, K≥2) is a set of total K(K−1)/2 links $L_{ij}$ (i,j: natural, 0≤i<j<K) that connects K switches $S_l$(l: natural, 0≤l<K) in all-to-all manner, where the link $L_{ij}$ connects between switches $S_i$ and $S_j$ A star connection of size K is a set of K links $L_i$ (l=0, 1, . . . , K−1) that connects K switches $S_l$(l: natural, 0≤l<K) and a switch called "center switch", where the link $L_i$ connects between switch $S_i$ and the center switch. The center switch can act as the center switch in more than one star connections.

Example 1: Stacked all-to-all Network with Point-to-Point Unified Stacking

In this example, a simple example of point-to-point unified stacking method is presented, where the baseline networks is a flat all-to-all topology. This is the simplest case of the point-to-point method and hence is explained here as an introductory example. This network is constructed based on an all-to-all network as shown in FIG. 1a.

Every switch in the baseline all-to-all network has N ports. A particular example of N=6 is shown in the FIG. 1a. First an all-to-all network is built using edge switches 102. Each switch 102, called an edge switch, serves up to N/2 end points 104, and is wired to up to N/2 other edge switches in an all-to-all manner. In FIG. 1a, each edge switch 102 has N/2 end points 104. (Only one set of end points 104 is shown with only one edge switch 102 for simplicity sake.) Each edge switch 102 is wired to each other edge switch 102 in the all-to-all network 106. Then in network 108 in FIG. 1b a set of switches 110 are inserted on the links that connect between edge switches. These switches 110 are called global switches. Similar to an edge switch, a global switch has N ports, although only two of them are used at this time. Finally, the whole network is duplicated or stacked 112 to create up to N/2 copies, or planes. FIG. 1c shows three such duplicated networks or planes. The global switches in the same position in these planes are consolidated into a single switch. For example, in FIG. 1c the three global switches labeled with "A" are really one switch, which has six ports connecting to six edge switches spread over three planes. Similarly, the switches that have the same label ("B", "C", "D", "E", and "F") are really the same respective switches, each having six ports. The number or quantity of planes (copies) is limited to N/2 because each global switch consumes two ports per plane, thus all N ports are used with N/2 planes. In general cases, there are total up to N(N+2)/8 global switches in a switched all-to-all network. (In the N=6 example, there are 6(6+2)/8=6 global switches).

With this baseline configuration, a stacked all-to-all switching network can scale to up to $N^2(N+2)/8 \sim N^3/8$ end points: Each plane has (N/2+1) edge switches. There can be up to N/2 such planes. Each edge switch has N/2 end points. Therefore, the maximum number of end points is $(N/2+1) \times (N/2) \times (N/2) = N^2(N+2)/8$. For example, with 36 port switches (N=36), a stacked all-to-all network could scale up to $36^2 \times (36+2)/8 = 6156$ end points. This is a good scalability for required number of switch ports, links, and number of hops. Since one hop over a global switch allows both intra-plane and inter-plane traversal, a stacked topology has good scalability and small diameter (number of hops).

As for system growth property, a system size (number of end points) could be increased by adding planes. Initially a system can be built with less than N/2 planes. More planes can be added afterward to increase the system size until the number of planes reaches the upper limit of N/2, without affecting the existing wiring.

A stacked all-to-all network can be partitioned in units of planes without interference among partitions. Network traffic within each plane, or a group of planes, does not interfere with any other plane because the planes are decoupled by the global switches. Exploiting this property, various combinations of partition sizes are possible. For example, if there are 4 planes, possible partitioning examples include 2 partitions with 1 plane and 3 planes, 3 partitions with 1 plane×2 and 2 planes×1, and 4 of 1 plane partitions.

Deadlock free direct and indirect routing methods are available on a stacked all-to-all network. Direct routing path shown in FIG. 2 consists of 4 link hops: Injection, $S_{up}$, $S_{down}$, and Reception. The Injection hop (1) is to traverse from the source endpoint 204 to the start edge switch 212. The second hop $S_{up}$ (2), is to travel over the link from the start edge switch 212 to a global switch 210 labeled E in the figure. The next hop $S_{down}$ is to travel from the global switch 210 to the destination edge switch 206. The final hop Reception is to hop from the edge switch 206 to the destination endpoint 208. As described above, the 3 "E" labeled switches in FIG. 2 are actually a single switch connected to edge switches in each plane.

Figure 3:
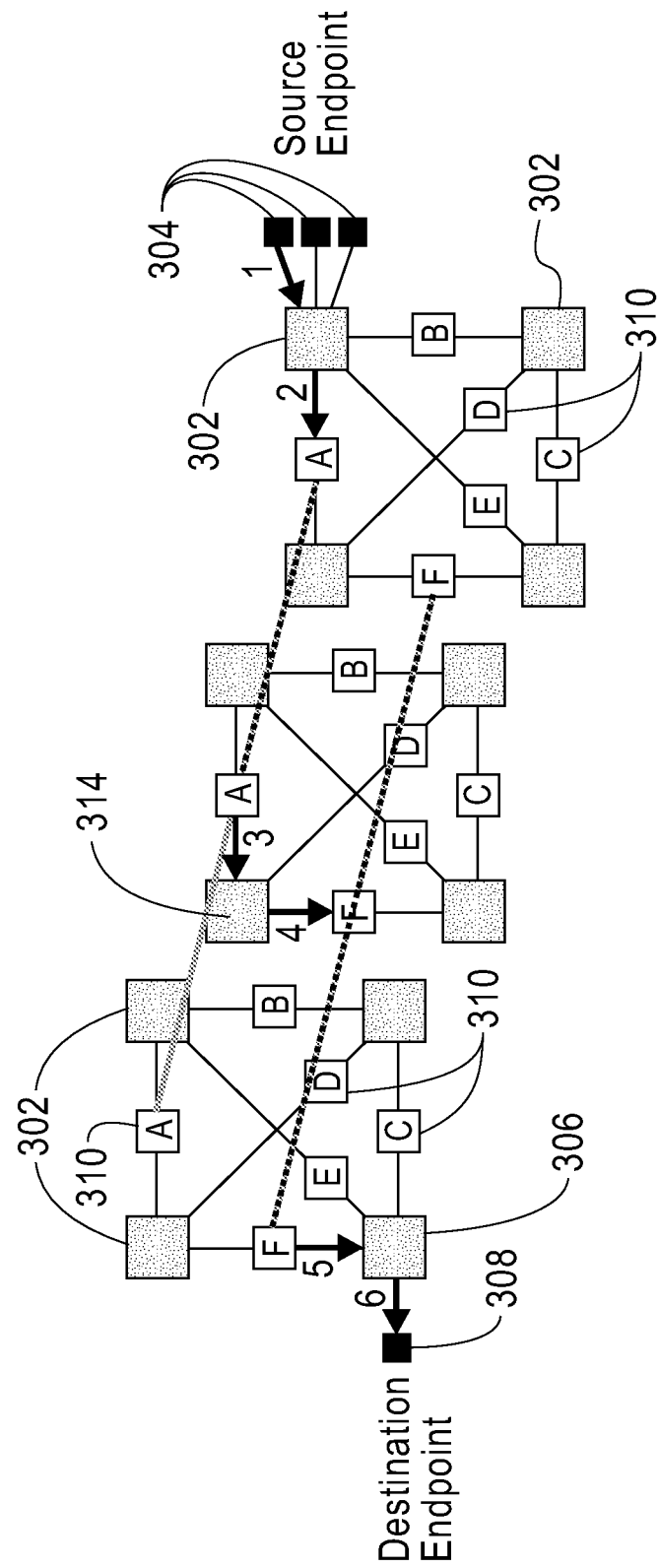
FIG. 3 shows an aspect of a network topology illustrating an indirect routing method.

Indirect routing path shown in FIG. 3 consists of 6 link hops: Injection (1), $S_{up}$ (2), $S_{down}$ (3), $S_{up}$ (4), $S_{down}$ (5), and Reception (6). For indirect routing, an intermediate edge switch 314 is selected. The first 3 link hops, Injection (1), $S_{up}$ (2), and $S_{down}$ (3), are to reach this intermediate edge switch 314 from the source endpoint 304. Subsequently the remaining three linkhops, $S_{up}$ (4), $S_{down}$ (5), and Reception (6), carry the packet to the final destination endpoint 308. The global switches with the same letter label (A, B, C, D, E, and F) are the same switch. This applies to both A labeled switches and F labeled switches in FIG. 3.

In a worst case 3 VCs (virtual channels) will be required to support indirect routing with any unrestricted order. With restricted ordering, 2 VCs will suffice for indirect routing. Direct routing requires only 1 VC.

Example 2: Stacked 2D HyperX with Point-to-Point Unified Stacking

This is another example of point-to-point unified stacking method, where the baseline network is a 2D HyperX topology.

The point-to-point unified stacking method could be applied to any topology that contains all-to-all connections. A 2D HyperX network is one such topology and can be stacked using this method as shown in FIG. 6c described below.

Figure 6A:
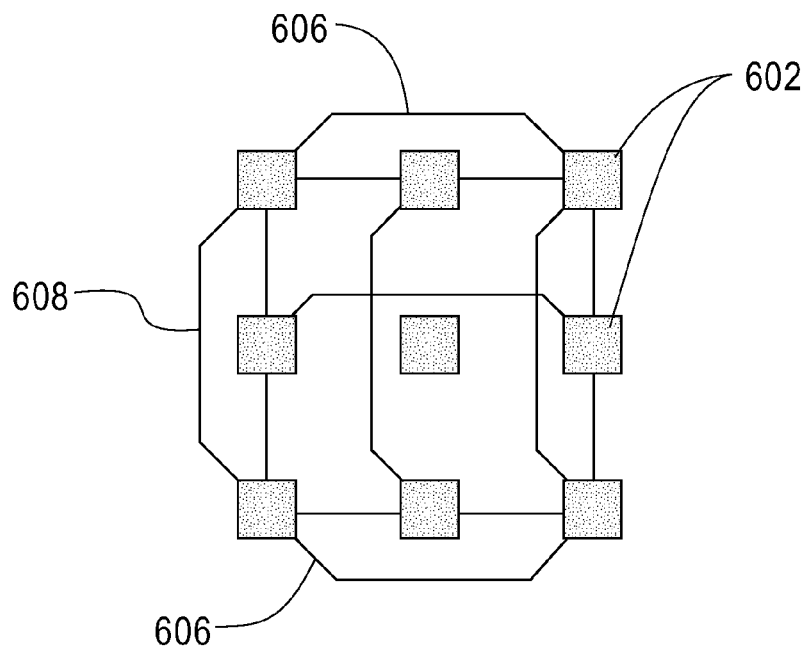
FIG. 6a shows an embodiment of a 2D HyperX topology network.
Figure 6B:
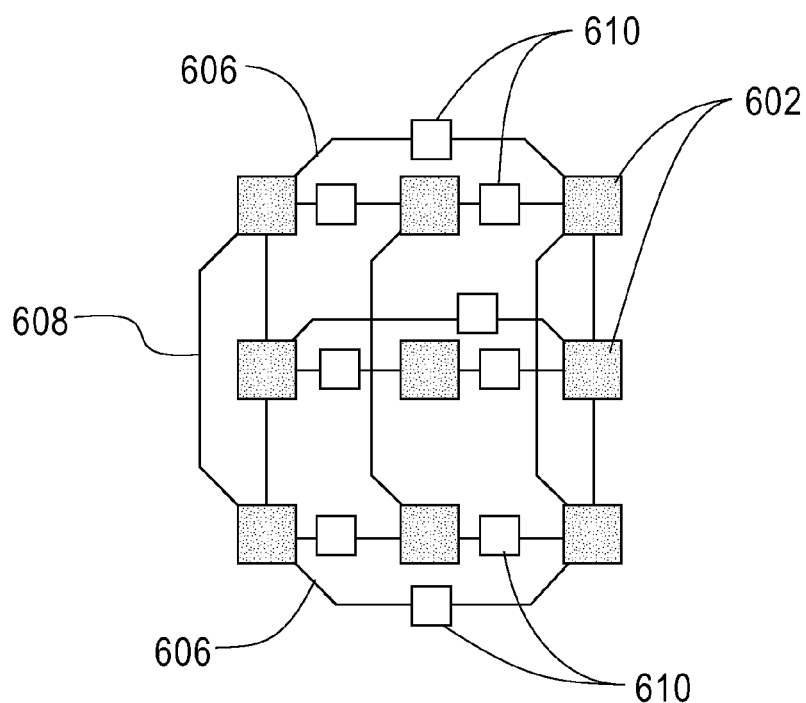
FIG. 6b shows an embodiment of a 2D HyperX topology network with global switches on the S links for point-to-point unified stacking.
Figure 6C:
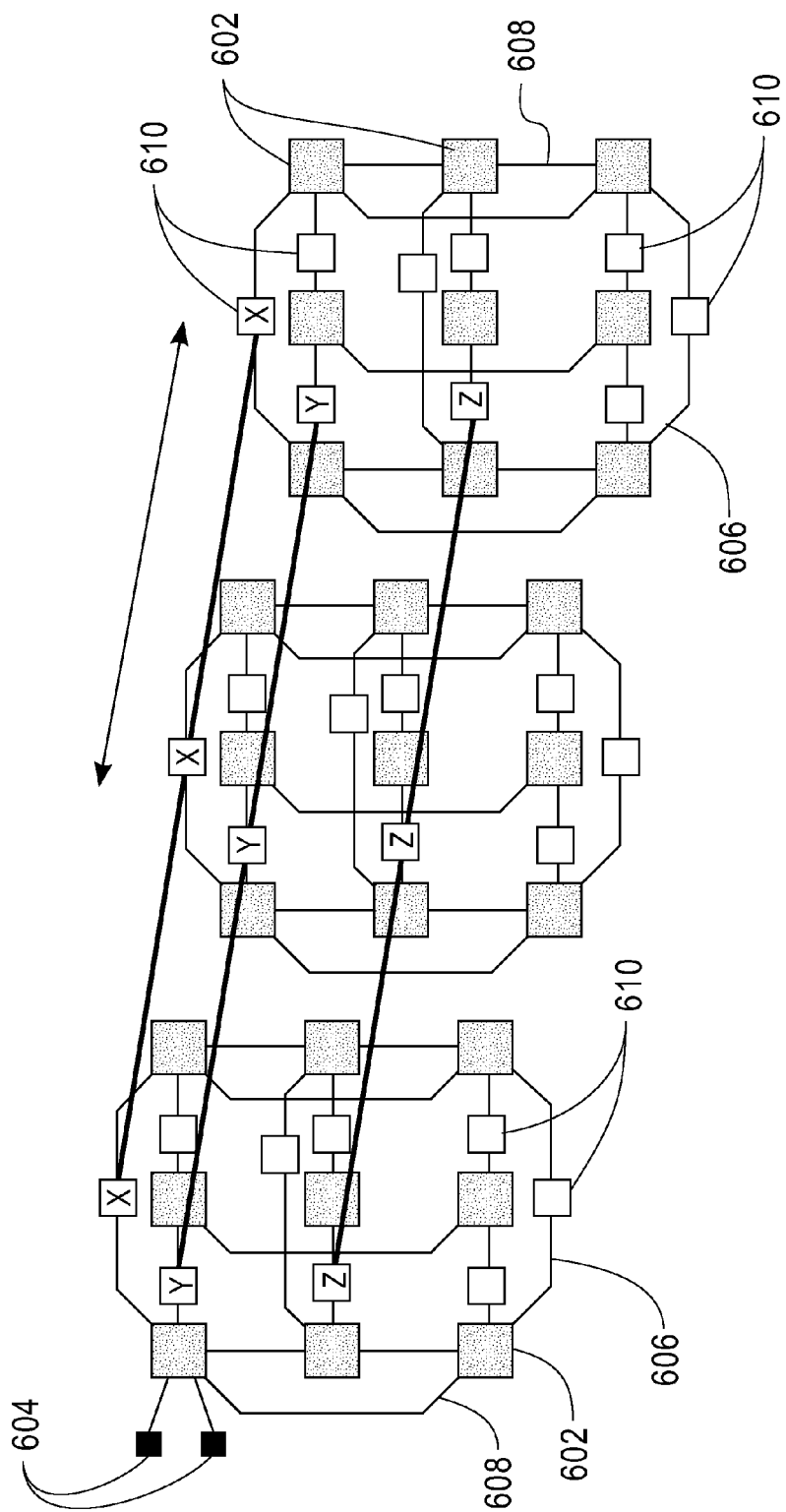
FIG. 6c shows an embodiment of a stack of 2D HyperX topology networks with global switches on the S links, created by point-to-point unified stacking.

In FIG. 6a there is shown a 2D HyperX topology consisting of nine edge switches 602 (each of the two dimensions consists of 3 edge switches). S links 606 are in the horizontal direction as viewed in the figures. L links 608 are in the vertical direction as viewed in the figures. Each switch belongs to two different groups of switches with all-to-all connections within the group: a group in the horizontal direction, and a group in the vertical direction. We can apply stacking to either, or both, of the dimensions. We illustrate this where it is applied to the horizontal direction. In FIG. 6b global switches 610 are inserted on one dimension (S links in the figure), and then multiple copies of the 2D HyperX networks are stacked. Each edge switch 602 has N ports. N/3 ports are wired to end points 604, another N/3 to one HyperX dimension (L links), and the rest of N/3 to the other HyperX dimension (e.g., S links) which is now bridged using the global switches 610. Therefore, the network scales to up to $\sim N^4/54$ end points (N=number of switch ports):

Referring to FIG. 6c, there are N/3 end points 604 connected to each edge switch 602. Each HyperX dimension size is N/3+1. Thus there are $(N/3+1)^2$ edge switches in each plane. Each global switch uses 2 ports per plane. Thus there are total N/2 planes. Therefore, the total number of end points 604 can be up to $N/3 \times (N/3+1)^2 \times N/2 = N^2(N+3)^2/54 \sim N^4/54$.

Direct route consists of five cable hops (Injection, L, $S_{up}$, $S_{down}$, and Reception). Indirect routing consists of up to eight cable hops since L, $S_{up}$, and $S_{down}$ can be repeated up to twice. Similar to stacked all-to-all topology, 3 VCs are required for fully-flexible indirect routing with unrestricted ordering, 2 VCs are required for indirect routing restricted ordering, and 1 VC for direct routing. Similar to stacked all-to-all, the stacked HyperX network could be partitioned into multiple planes (or set of planes) without interfering with each other. As for modular system growth, initially the system could have a small number of planes (<N/2), and additional planes could be added afterward.

Example 3: Stacked all-to-all with Grouped Unified Stacking

This example covers a simple example of grouped unified stacking, where the baseline network is a flat all-to-all topology. The grouped method is an aspect of the invention different from Example 1 where the point-to-point method is applied to a flat all-to-all topology.

In the point-to-point method described above in Examples 1 and 2, a global switch bridges two existing edge switches in each plane. In general, a global switch could bridge three or more edge switches in each plane, which we call "grouped unified stacking" or "multi-way stacking".

Figure 5:
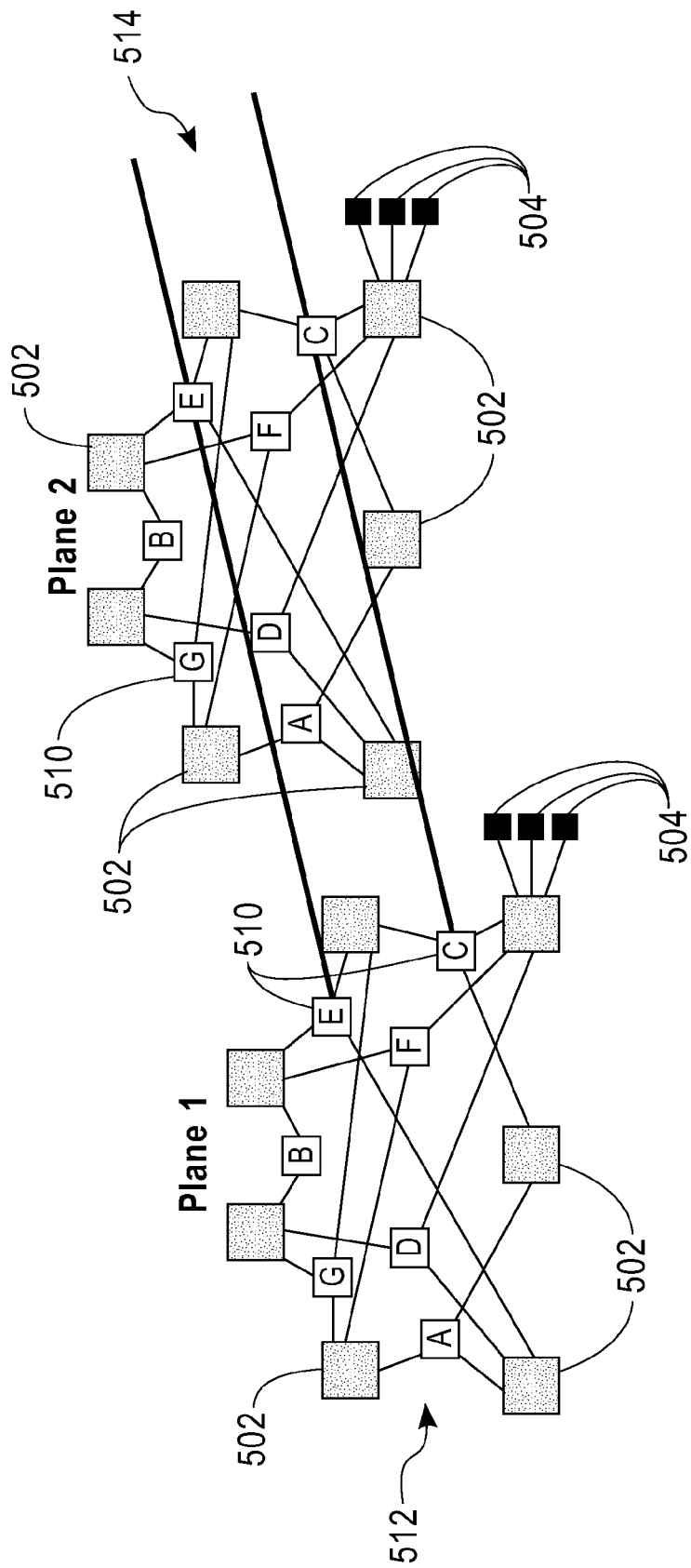
FIG. 5 shows an aspect of the invention referred to as group unified switching stacking, where the baseline network is a flat all-to-all.

FIG. 5 shows an example of grouped unified stacking method. In FIG. 5, 3-way all-to-all components are replaced with 3-way star connections to global switches 510. The global switches 510 act as the center switches in the star connections. For example, global switch 510 labeled "A" serves three edge switches 502 in a plane 512, replacing the 3-way all-to-all links among these three edge switches. Each plane 512, 514 has seven edge switches. Each global switch 510 bridges three edge switches 502. Any edge switch 502 can reach to any other edge switch 502 via one hop through a global switch 510.

In FIG. 5 each global switch 510 bridges three edge switches (rather than two) in each plane. There are seven edge switches 502 on each plane 512, 514. These edge switches are connected with each other via 7 global switches 510. Any edge switch 502 can reach to any other edge switch 502 via one hop through a global switch 510. Thus the required number of hops is the same as in the point-to-point method. Each edge switch 502 has three end points 504 with six ports.

With this grouped unified stacking method, an edge switch could reach two other edge switches on the same plane via one up link port to a global switch. Therefore, more edge switches could be placed in each plane. Thus, multi-way stacking is a useful way to build larger scale network with limited number of switch ports. However, the number of planes is reduced since each global switch needs more ports per plane. For this reason, the improvement in terms of scalability is limited.

When the grouped unified stacking method is applied to a flat all-to-all baseline network, the maximum network scale (number of end points) is $N^2(N+1)/6 \sim N^3/6$, which is better than $N^3/8$ with the point-to-point method (N=number of switch ports): There are N/2 end points connected to each edge switch. Each edge switch has N/2 uplink ports to N/2 global switches. Each global switch allows the edge switch to travel to two different edge switches. Therefore, in each plane there can be up to $N/2*2+1=N+1$ edge switches. Since each global switch uses three ports per plane, there can be up to N/3 planes. Therefore, there can be total $(N/2)*(N+1)*(N/3)=N^2(N+1)/6 \sim N^3/6$ end points.

With similar discussions, k-way stacked all-to-all scales to up to $\sim((k-1)/k)*N^3/4$. Thus the upper limit with a large k is $N^3/4$, about 2 times larger than $N^3/8$ with point-to-point unified stacking method.

Example 4: Stacked 2D HyperX with Grouped Unified Stacking

This is another example of grouped unified stacking method, where the baseline network is 2D HyperX.

Figure 7A:
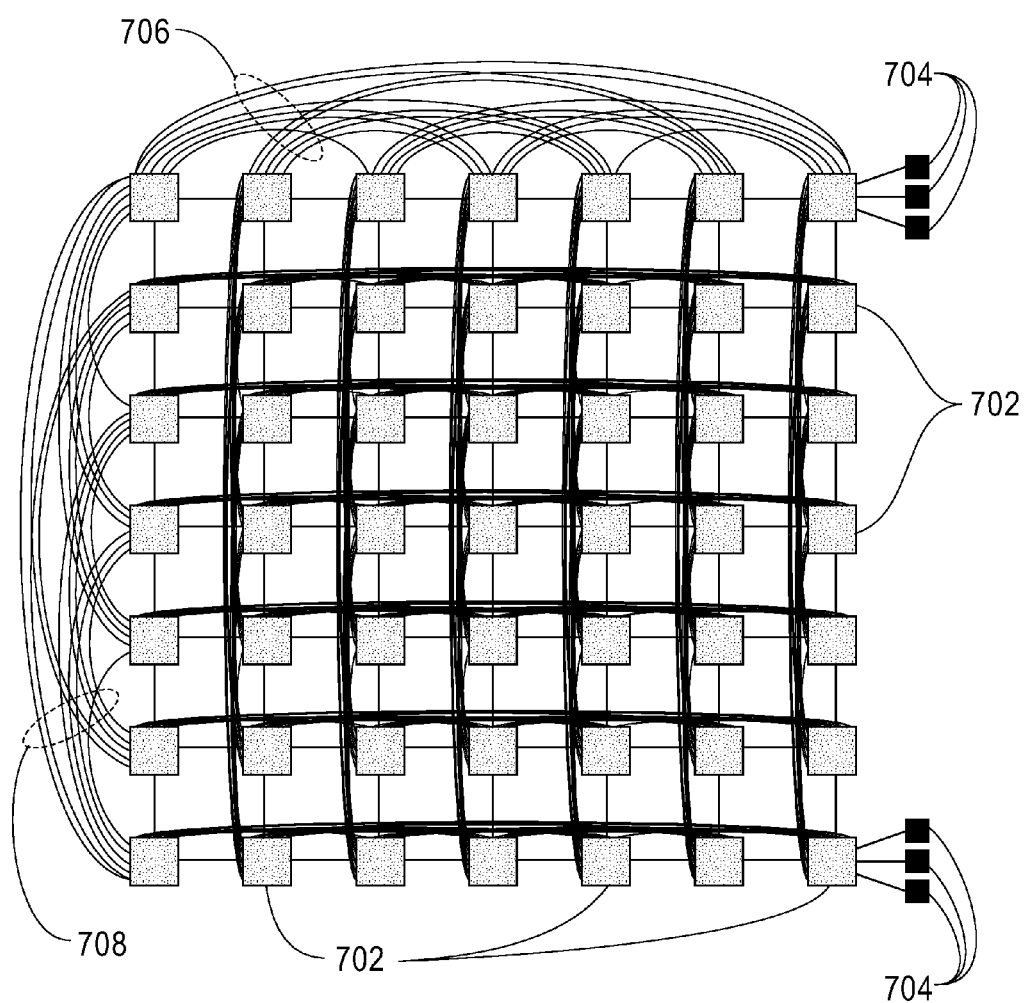
FIG. 7a shows an embodiment of a 2D HyperX topology network.
Figure 7B:
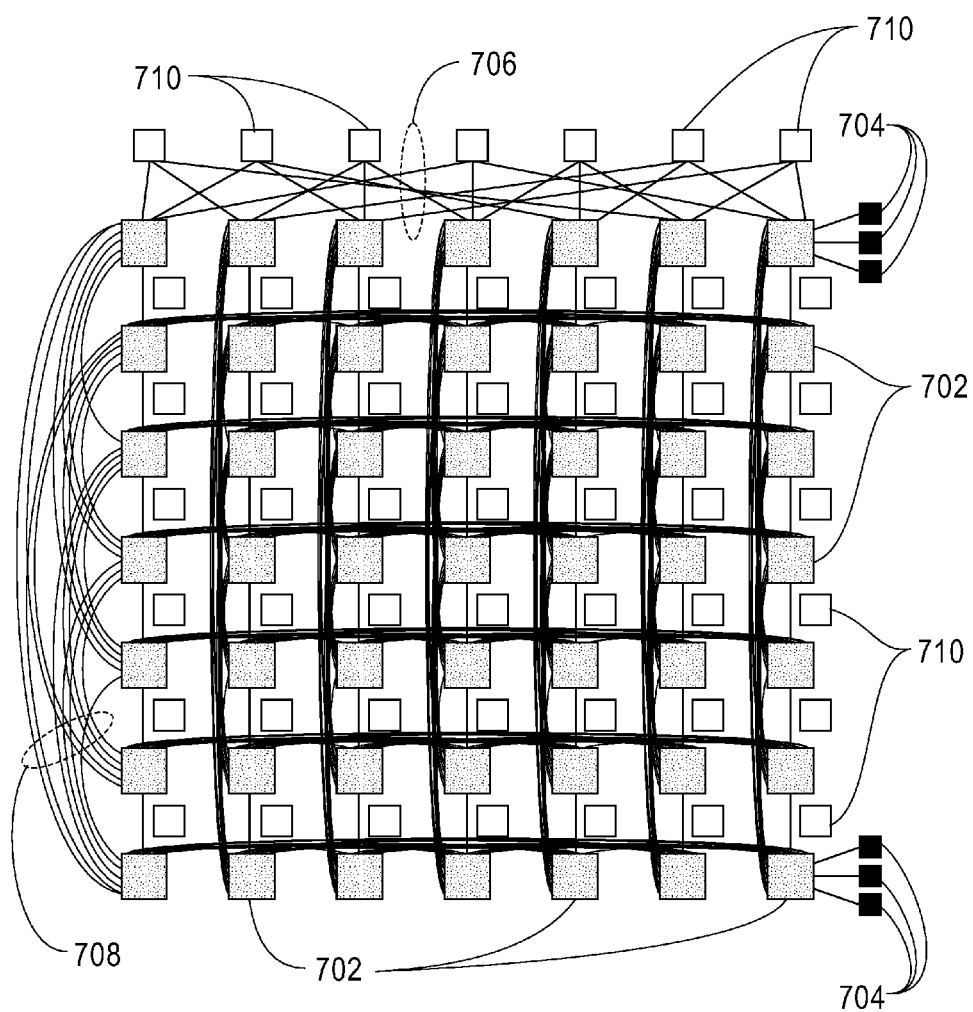
FIG. 7b shows an embodiment of a 2D HyperX topology network with global switches for grouped unified stacking.

FIG. 7a shows the baseline 2D HyperX topology, which is a $(N_L+1) \times (N_S+1)$ array of edge switches 702, where $N_L$ is the number of L links and $N_S$ is the number of S links per edge switch. There are all-to-all L links along the vertical dimension, and all-to-all S links along the horizontal dimension. In FIG. 7b not all end points 704 are shown. When each end point switch has N ports, the optimal port assignment is $N_L=N_S=N/3$ to maximize the system scale. Thus there are $(N_L+1)(N_S+1)=(N/3+1)^2$ edge switches 702. When L=6, S=6→(6+1)*(6+1)=49 edge switches.

With grouped unified staking method, one dimension of the 2D HyperX wiring is replaced with 3-way star connections via global switches 710, as shown in FIG. 7b. For example, the star connection links 706 along S dimension replace original all-to-all wiring along S dimension. This is similar to the stacked all-to-all with 3-way grouped method in the Example 3. In FIG. 7b, each group of the 7 edge switches 702 along the S dimension is connected via seven global switches 710. There are total of 49 global switches. Note an edge switch now needs only three S links (as opposed to six in the original 2D HyperX).

Figure 8:
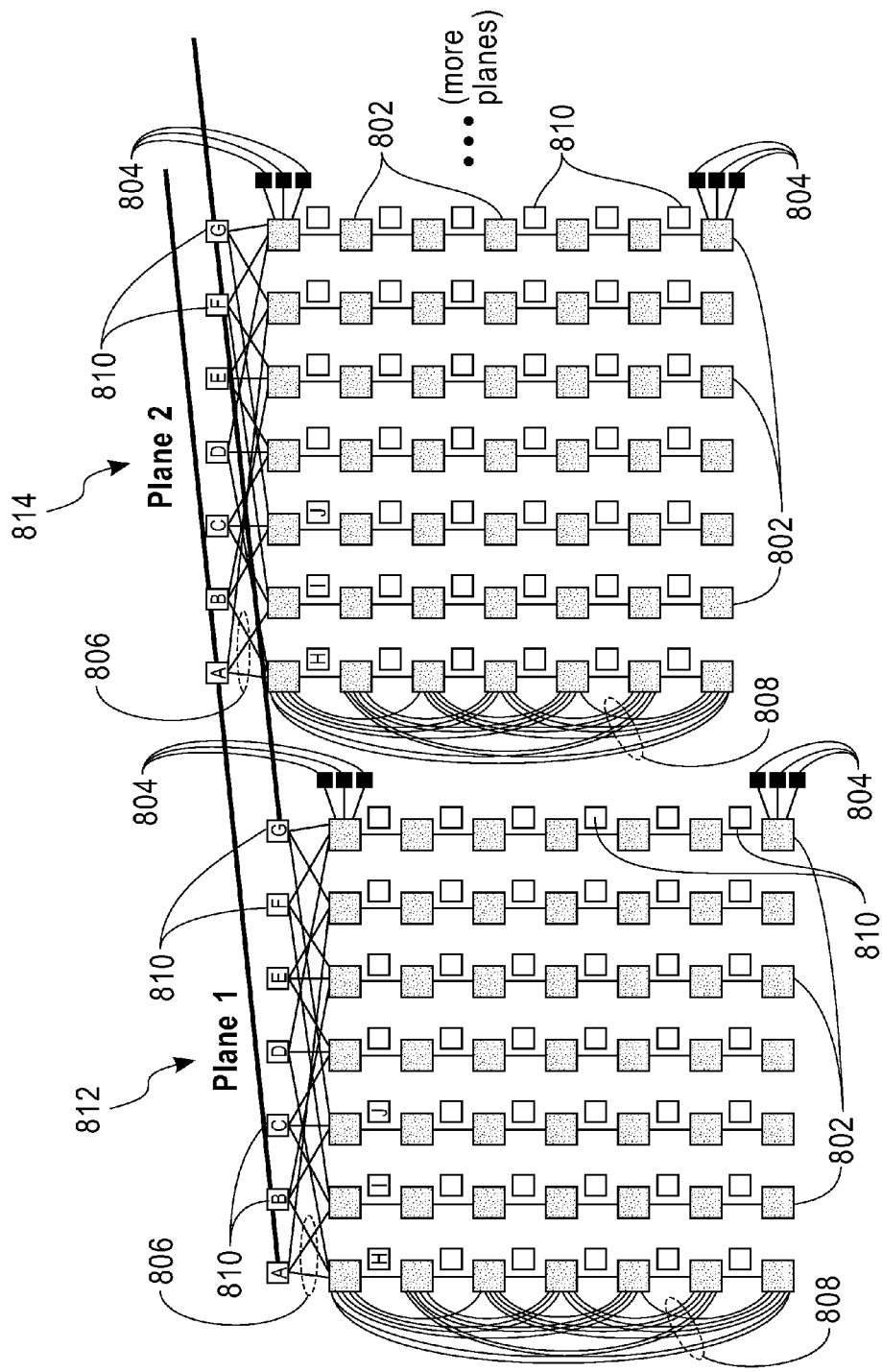
FIG. 8 shows an embodiment of a stacked 2D HyperX topology network created by grouped unified stacking.

FIG. 8 now shows multiple planes in the stacked 2D HyperX topology with 3-way stacking. The original 2D HyperX network can be duplicated into up to N/3 planes. In the figure, the global switches 810 in the same position in each plane 812, 814 are really one switch. For example, the "A" switches in each plane 812 and 814, ... are only one switch. It is the same for "B", "C", "D", ... switches. The maximum network size is up to $N/3*(N/3+1)*(2N/3+1)^2*N/3=N^2(N+3)(2N+3)^2/81 (\sim 2N^4/81)$ endpoints 804. Up to N/3 endpoints 804 can be connected to an edge switch 802, up to N/3+1 edge switches can be placed along L dimension, up to 2N/3+1 edge switches can be placed along S dimension, and up to N/3 planes can be created. A direct routing path is five cables hops (Injection+L+S_up+S_down+Reception). An indirect routing path is a maximum of eight cable hops (additional L, S_up and S_down).

In general cases, with k-way grouped unified stacking method, a Stacked HyperX network would scale to $\sim((k-1)/k)*N^4/27$ end points.

Additional Topologies

Although the detail is omitted, the Stacked 2D HyperX topology could be further stacked using the L links. For example, another set of global switches are inserted on the L links 608 in FIG. 6c, and the whole Stacked 2D HyperX network is further replicated into N/2 copies, connected with the new global switches. This will allow a very large network (scales to $\sim N^5/108$ end points with point-to-point unified stacking method) and many partitions ($N^2/4$), but require additional cost for extra global switches and links.

These unified stacking methods can be applied to vast ranges of baseline networks that contain all-to-all connections, such as Dragonfly, 3D HyperX, or M-dimensional HyperX for general cases where M>3. Here one could stack one, or more, of the dimensions.

Oversubscribed Stacking

Figure 4:
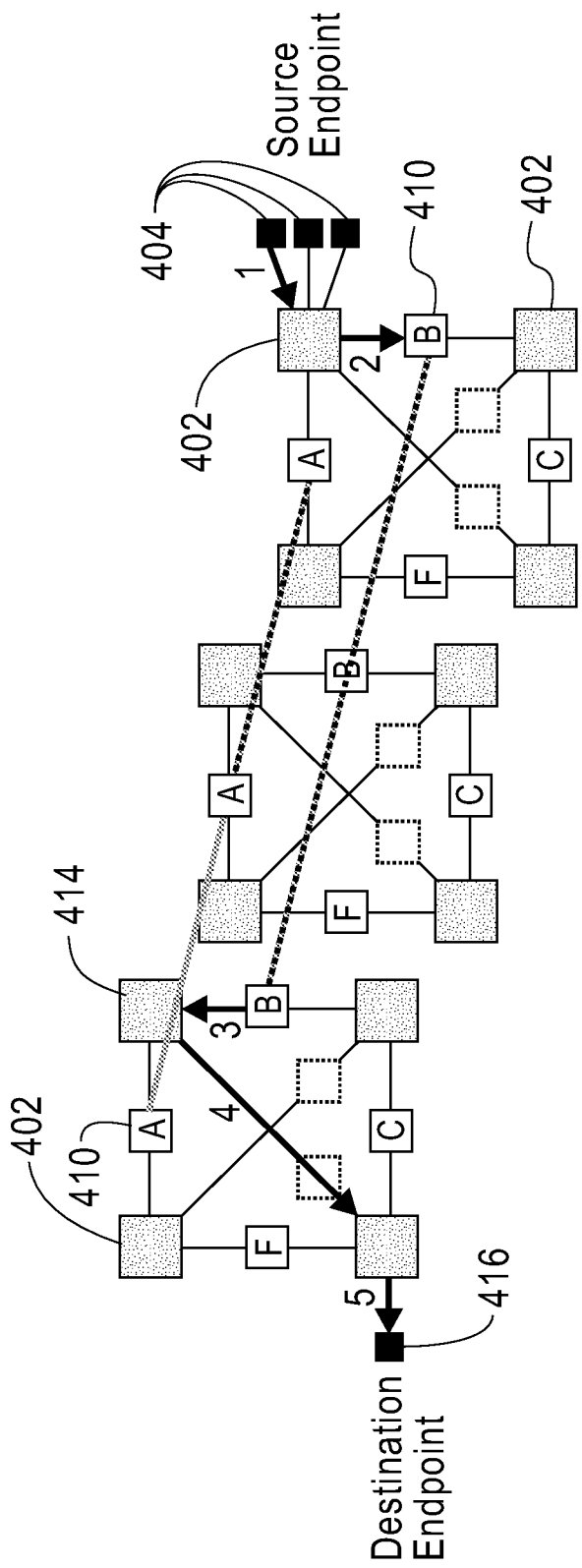
FIG. 4 shows oversubscribed stacking of all-to-all network topology.

To save costs, sometimes a network is designed to have less global bandwidth (i.e. bandwidth between long-distance endpoint pairs) than local bandwidth. Such networks are often called oversubscribed networks. The stacking method described supports such demands of cost-effective oversubscribing by having global switches on only a fraction of the links. FIG. 4 shows an example of oversubscribed stacked all-to-all topology. Different from the original stacked all-to-all, which had six global switches, the oversubscribed network shown in FIG. 4 has only four global switches 410. The rest of the links do not have global switches and hence the edge switches are directly wired within the plane. The "missing" global switches are shown in dotted outline. As a result, the number of links and switches are reduced, resulting in lower cost. However, there is degradation in the number of hops and global bandwidth. As shown in FIG. 4, in a worst case 5 hops are required (first two hops to move from source endpoint 404 to the destination global switch 410, and the remaining three hops to travel from the global switch 410 to the destination end point 416). Since there are five hops, the oversubscribed stack is worse than the four hops on the original stacked all-to-all topology. As for the global bandwidth, the oversubscribed network in FIG. 4 has only ⅔ of the original stacked all-to-all network. The number of global switches could be adjusted to balance the cost and the global bandwidth for a certain use case. The 3 "B" labeled global switches in FIG. 4 are a single switch.

FIG. 9 illustrates a schematic diagram of an example computer or processing system that may implement the extending the scalability and improving the partitionability of baseline networks for transporting packet traffic from a source endpoint to a destination endpoint in one exemplary embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 9 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 902, a system memory 906, and a bus 904 that couples various system components including system memory 906 to processor 902. The processor 902 may include a module 900 that performs the methods described herein. The module 900 may be programmed into the integrated circuits of the processor 902, or loaded from memory 906, storage device 908, or network 914 or combinations thereof.

Bus 904 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 906 can include computer system readable media in the form of volatile memory, such as random access memory (RAM) and/or cache memory or others. Computer system may further include other removable/non-removable, volatile/non-volatile computer system storage media. By way of example only, storage system 908 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 904 by one or more data media interfaces.

Computer system may also communicate with one or more external devices 916 such as a keyboard, a pointing device, a display 918, etc.; one or more devices that enable a user to interact with computer system; and/or any devices (e.g., network card, modem, etc.) that enable computer system to communicate with one or more other computing devices. Such communication can occur via Input/Output (I/O) interfaces 910.

Still yet, computer system can communicate with one or more networks 914 such as a local area network (LAN), a general wide area network (WAN), and/or a public network (e.g., the Internet) via network adapter 912. As depicted, network adapter 912 communicates with the other components of computer system via bus 904. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of building a multiple plane unified stacking topology network comprising:
providing a baseline network comprising endpoints, edge switches, and links, and containing more than one decoupled all-to-all connections that are not contained in a larger all-to-all connection;
duplicating the baseline network, each duplicated baseline network forming a plane, to form a multiple plane switching topology;
providing global switches decoupling multiple planes, each global switch in the same position in the multiple planes are consolidated into a single switch;
replacing the links in all or a subset of the all-to-all connections in each plane with a set of star connections, where each of target all-to-all connections is decomposed into smaller all-to-all connections and replacing each of the smaller all-to-all connections with a star connection of the same size in each plane and where a global switch acts as the center switch of the star connection and each global switch connected to each plane acts as the center switches of star connections in multiple planes;
connecting each global switch directly to edge switches in multiple planes, and
transporting packet traffic from a source end point selected from the endpoints and a destination endpoint selected from the endpoints,
wherein the packet traffic within each plane of the multiple planes does not interfere with other planes of the multiple planes based on the decoupling of the multiple planes.

2. The method as set forth in claim 1, where each edge switch has N ports and each global switch is connected to up to N/2 edge switches.

3. The method of claim 1, where the edge switches are connected symmetrically within a plane.

4. The method as set forth in claim 3, where the baseline network is a 2D HyperX topology.

5. The method as set forth in claim 1, where the baseline network is a 2D HyperX topology.

6. The method as set forth in claim 1, where the target all-to-all connections are decomposed into smaller all-to-all connections with size 2 and the star connections are of the same size 2 in each plane.

7. The method as set forth in claim 6, where each edge switch has N ports and each global switch is connected to up to N/2 edge switches.

8. The method of claim 6, where the edge switches are connected symmetrically within a plane.

9. The method as set forth in claim 8, where the baseline network is a 2D HyperX topology.

10. The method as set forth in claim 6, where the baseline network is a 2D HyperX topology.

11. A multiple plane unified stacking topology network comprising:
baseline network comprising endpoints, edge switches, and links, and containing more than one decoupled all-to-all connections that are not contained in a larger all-to-all connection;
multiple baseline networks, each multiple baseline network forming a plane, forming multiple plane switching topology;
global switches connecting multiple planes, each global switch in the same position in the multiple planes are consolidated into a single switch;
the links in all or a subset of the all-to-all connections in each plane are replaced with a set of star connections, where each of the target all-to-all connections is decomposed into smaller all-to-all connections and replacing each of the smaller all-to-all connections with a star connection of the same size in each plane, and where a global switch acts as the center switch of the star connection and each global switch connected to each plane acts as the center switches of star connections in multiple planes;
each global switch being directly connected to edge switches in multiple planes, and
transporting packet traffic from a source end point selected from the endpoints and a destination endpoint selected from the endpoints,
wherein the packet traffic within each plane of the multiple planes does not interfere with other planes of the multiple planes based on the decoupling of the multiple planes.

12. The network as set forth in claim 11, where each edge switch has N ports and each global switch is connected to up to N/2 edge switches.

13. The network as set forth in claim 11, where the edge switches are connected symmetrically within a plane.

14. The network as set forth in claim 13, where the baseline network is a 2D HyperX topology.

15. The network as set forth in claim 11, where the baseline network is a 2D HyperX topology.

16. The network as set forth in claim 11, where the target all-to-all connections are decomposed into smaller all-to-all connections with size 2 and the star connections are of the same size 2 in each plane.

17. The network as set forth in claim 16, where each edge switch has N ports and each global switch is connected to up to N/2 edge switches.

18. The network as set forth in claim 16, where the edge switches are connected symmetrically within a plane.

19. The network as set forth in claim 18, where the baseline network is a 2D HyperX topology.

20. The network as set forth in claim 16, where the baseline network is a 2D HyperX topology.

21. A multiple plane grouped unified stacked all-to-all topology network comprising:
a flat all-to-all baseline network comprising endpoints, edge switches, and links;
multiple baseline networks each multiple baseline network forming a plane, forming a multiple plane switching topology;
global switches connecting multiple planes, each global switch in the same position in the multiple planes are consolidated into a single switch;
the links in the all-to-all baseline network in each plane are replaced with a set of star connections, where the all-to-all baseline network is decomposed into smaller all-to-all connections with size 3 or larger and replacing each of the smaller all-to-all connections with a star connection of the same size in each plane, and where a global switch acts as the center switch of the star connection and each global switch connected to each plane acts as the center switches of star connections in multiple planes;
each global switch being directly connected to edge switches in multiple planes, and
transporting packet traffic from a source end point selected from the endpoints and a destination endpoint selected from the endpoints,
wherein the packet traffic within each plane of the multiple planes does not interfere with other planes of the multiple planes based on the decoupling of the multiple planes.

* * * * *